(12) United States Patent
Wieczorek

(10) Patent No.: US 11,697,381 B2
(45) Date of Patent: Jul. 11, 2023

(54) DEVICE AND METHOD FOR OPERATING AN OBJECT DETECTION SYSTEM FOR THE PASSENGER COMPARTMENT OF A MOTOR VEHICLE, AND A MOTOR VEHICLE

(71) Applicant: MOTHERSON INNOVATIONS COMPANY LIMITED, London (GB)

(72) Inventor: Romeo Wieczorek, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 17/053,438

(22) PCT Filed: May 9, 2019

(86) PCT No.: PCT/EP2019/061933
§ 371 (c)(1),
(2) Date: Nov. 6, 2020

(87) PCT Pub. No.: WO2019/215286
PCT Pub. Date: Nov. 14, 2019

(65) Prior Publication Data
US 2021/0245676 A1    Aug. 12, 2021

(30) Foreign Application Priority Data

May 9, 2018 (DE) .......................... 102018111239.4

(51) Int. Cl.
*B60R 11/04* (2006.01)
*B60Q 3/76* (2017.01)
(52) U.S. Cl.
CPC ............... *B60R 11/04* (2013.01); *B60Q 3/76* (2017.02); *B60R 2300/105* (2013.01)

(58) Field of Classification Search
None
See application file for complete search history.

(56) References Cited

U.S. PATENT DOCUMENTS 6,678,598 B1  1/2004  Hillebrand et al.
9,552,524 B2  1/2017  Artan et al.
(Continued)

FOREIGN PATENT DOCUMENTS

WO   WO 2016/067082 A1   5/2016

OTHER PUBLICATIONS

International Search Report dated Aug. 8, 2019 of International application No. PCT/EP2019/061933.
(Continued)

*Primary Examiner* — Rebecca A Volentine
(74) *Attorney, Agent, or Firm* — Jones Day

(57) ABSTRACT

An object detection device for detecting at least one moving object, provided by a vehicle occupant or in form of at least a part of the vehicle occupant, in the interior of a motor vehicle, includes a camera system comprising at least one sensor for converting electromagnetic radiation into electrical signals and a lighting device with at least one light source and an optic system, and a control or regulating device which is designed to receive one or more of the electrical signals from the camera system or data from at least one sensor, at least one further device or at least one device of the motor vehicle, to generate control commands and to transmit them to the camera system, the at least one further device or the at least one device of the motor vehicle.

21 Claims, 21 Drawing Sheets

(56) References Cited

U.S. PATENT DOCUMENTS

| | | | |
|---|---|---|---|
| 2007/0262574 A1* | 11/2007 | Breed | B60R 21/0152 |
| | | | 280/735 |
| 2012/0098968 A1 | 4/2012 | Schofield et al. | |
| 2017/0247000 A1* | 8/2017 | Ricci | B60R 16/037 |
| 2019/0077323 A1* | 3/2019 | Qin | B60R 7/04 |

OTHER PUBLICATIONS

Written Opinion dated Aug. 8, 2019 of International application No. PCT/EP2019/061933.

* cited by examiner

DEVICE AND METHOD FOR OPERATING AN OBJECT DETECTION SYSTEM FOR THE PASSENGER COMPARTMENT OF A MOTOR VEHICLE, AND A MOTOR VEHICLE

CROSS-REFERENCE TO RELATED PATENT APPLICATIONS

This application is a National Stage Entry of International Patent Application No. PCT/EP2019/061933, filed May 9, 2019, which claims the benefit of priority to German Patent Application No. DE 10 2018 111 239.4, filed May 9, 2018, each of which is hereby incorporated by reference in its entirety for all purposes.

BACKGROUND

1. Field of the Invention

The invention relates to an object detection device for detecting at least one, in particular moving, object, preferably provided by a vehicle occupant or in the form of at least part of the vehicle occupant, in the interior of a motor vehicle, which comprises a camera system comprising at least one sensor for converting electromagnetic radiation into electrical signals and a lighting device with at least one light source and an optic system, a control or regulating device, which is designed to receive the electrical signals from the camera system and/or data from at least one sensor, at least one further device and/or at least one device of the motor vehicle, to generate control commands and to send them to the camera system, the further device and/or the device of the motor vehicle and a method for operating such an object detection device and a motor vehicle with such a detection device or for carrying out said method.

2. Related Art

An increasing number of electronic (digital) display surfaces and assistance systems are being installed in modern motor vehicles, which on the one hand can replace the classical analog instrumentation of the motor vehicle and on the other hand can provide additional information, such as map views, user interfaces for entertainment and telecommunication systems and the like, as well as take over or support the control and monitoring of various vehicle systems, in particular based on the condition of the vehicle occupants.

It has been shown that the operation of such display surfaces and assistance systems by means of classical input devices such as buttons, joysticks, touchpads or similar devices is very complex and can therefore lead to incorrect input by the driver on the one hand and, on the other, entail a high risk of distraction for the driver.

For this reason, it is desirable to provide as simple as possible non-contact input methods. For example, the U.S. Pat. No. 9,244,527 B2 is a camera-based operating device for directional gesture control. The user's line of sight selects a target device or a function that is to be affected by a following gesture input.

In vehicles, for example, a new camera system is used that has a light source and can actively illuminate the area in front of the camera. So-called time-of-flight cameras (TOF cameras) are known in this context, in which the time between a light emission of the light source of the TOF camera and the registration of the reflection at the camera sensor of the camera system is measured. From this the distance of the reflecting surface to the respective pixels of the camera system can be determined.

Especially in modern and future motor vehicles, the motor vehicle itself can take over the navigation and control of most of the vehicle device as a so-called autonomous vehicle. The vehicle occupant can then, depending on the situation, be partially or completely released from driving the vehicle. With advanced systems, it is also possible that none of the vehicle occupants need to be aware of the processes taking place in the environment and triggered by the vehicle. As a result, each occupant can concentrate on other things, such as display devices for personal entertainment, relax or even sleep. Furthermore, the vehicle occupant can adjust his or her seating position and orientation as desired, for example to lie down and/or turn towards other vehicle occupants or display devices.

However, it has been found that for object detection using TOF cameras, the distance of the object to be analyzed, such as a person's hand or head, to the camera system plays a decisive role in the unambiguous identification of a gesture, a line of sight, a head position and movement and/or facial expression. In particular, with increasing distance to the camera system, the difficulty of making a clear statement about the object is increased, so that operating and detection errors can often occur. In particular, it is possible that random gestures, which are not intended as operating inputs per se, are falsely detected as such, so that the contents of display surfaces or the status of assistance systems are unintentionally changed by a vehicle occupant, especially the driver of the vehicle. Another frequent source of error is the failure to detect a gesture or head movement. The reason for such errors is mainly the lack of illumination of the depth range. As a result, the camera system cannot provide sufficient data to allow the object detection system to make a clear statement about the state of the object. Especially due to the various possibilities of adjusting the seating position, it can happen that the object cannot be sufficiently illuminated and/or the object is not completely within the detection range of the camera system. An increase of the light output of lighting device is not possible in all cases. Thus, the light output that can be made available is limited by various factors. Some of these are the available installation space, the available power supply, the produced waste heat and the power limitation of the lighting device.

From U.S. Pat. No. 6,441,363 B1, a vehicle occupant detection system is known to comprise a single laser array mounted on a vehicle structure to generate a first beam directed at a first occupant zone, a second beam directed at a second occupant zone, and a third beam directed at a third occupant zone, wherein the first, second, and third beams are all generated from generally the same position on the vehicle structure. Further comprising: a first sensor arrangement for receiving reflected beams resulting from the first beam which meets a first section of an occupant present in the first zone, the first sensor arrangement generating a first signal proportionally representative of the first section of the occupant present in the first zone; a second sensor arrangement for receiving reflected beams resulting from the second beam which meets on a second section of the occupant present in the second zone, the second sensor arrangement generating a second signal proportionally representative of the second section of the occupant present in the second zone; and third sensor means for receiving reflected beams resulting from the third beam which meets a third section of the occupant present in the third zone, the third sensor means generating a third signal proportionally representative of the third section of the occupant present in the third zone. A central processor for receiving the first, second and third signals and combining the signals is used to determine the position of the occupant within the vehicle.

Concerning a device for contactless detection of objects and/or persons and gestures and/or operating procedures performed by them, the latter is arranged in a vehicle interior in accordance with WO 2013/001084 A1 and comprises at least one lighting unit, a display device and an optical detection unit, the lighting unit being formed from at least one infrared laser, in particular an infrared laser diode. An object and/or a person and/or gestures and/or operating procedures performed by this person can be recorded three-dimensionally in particular by means of the optical detection unit. For example a movement of a hand or a finger of a vehicle driver is thus three-dimensionally seized, which corresponds for example to a virtual operation of a display device in the vehicle. This can be the recording of an operating process with a gesture, such as a back and forth movement of a finger or a wiping movement or opening the hand as a zoom movement. The use of infrared laser diodes is expected to provide improved coherence and higher spectral power density, resulting in a higher modulation bandwidth and more effective optical filtering.

US 2008/0048887 A1 concerns among others a vehicle occupant detection system comprising a photographic system which comprises: a first light source for emitting radiant light to a first object; a second light source for emitting radiant light to a second object different from the first object; a drive unit for driving the first light source and the second light source to switch between a first mode in which the light quantity of the first light source is greater than that of the second light source and a second mode in which the light quantity of the second light source is greater than that of the first light source; a photo unit comprising an optic system and an imaging chip for projecting images of the first object and the second object, which are arranged wholly or partially one above the other, onto a predetermined imaging area of the imaging chip by allowing the lights reflected from the first object and second object to enter the imaging chip through the optic system; a shadow filter for blocking part of the incident lights entering the imaging chip; and a control/calculation processor for outputting, as image information, an image projected onto the predetermined image area, wherein, when the drive unit is in the first mode, the shadow filter blocks light with a smaller amount than the incident light emitted from the first light source and reflected at the first object to enter the image chip, and the control/calculation processor gives, based on the mode of operation of the drive unit an image projected onto the predetermined imaging surface of the image chip as image information about the first object, and, when the drive unit is in the second mode, the shading filter blocks light of a smaller quantity than the incident light, which is emitted from the second light source and reflected at the second object to enter the image chip, and, based on the operating mode of the drive unit, the control/calculation processor outputs an image projected onto the predetermined imaging surface of the image chip as image information of the second object. In addition, a capture processor is provided for capturing information about the vehicle occupant, such as body type, position or posture of the vehicle occupant, based on the image information about either the first vehicle occupant or the second vehicle occupant output by the control/calculation processor of the photo system.

It is the task of the present invention to further develop the generic object detection device in such a way that it overcomes the disadvantages of the state of the art. In particular, the detection of the state of objects within the motor vehicle is to be made more reliable and thus the operation of display surfaces and assistance systems in the motor vehicle is to be facilitated.

SUMMARY

This task is solved by a device in which the lighting device can illuminate certain areas, in particular a near field and a far field, in the motor vehicle by means of at least one optical element of the optic system and/or at least one additional lighting device and/or an additional camera system, preferably positioned in each case in the vicinity of the object, in such a way that at least one distance information contained in the electrical signals can be detected by the camera system to a plurality of object points in the areas, wherein the illumination, the object localisation and/or detection and/or the activation of at least one of the lighting devices and/or camera systems is determined by the state of the motor vehicle, determined by speed, acceleration, vehicle seat occupancy, vehicle seat position, vehicle seat orientation and/or lighting, in particular the lighting of the vehicle interior, and/or by the state of the environment of the motor vehicle, determined by the weather, day, night, roadway, traffic signs and/or traffic situation.

Further advantageous designs are described in the following examples:

An embodiment describes an object detection device, in which the lighting device of the camera system, the additional lighting device and/or the lighting device of the additional camera system comprises or comprise more than one light source, wherein preferably each light source can be activated, in particular independently of one another, depending on the state of the object, the motor vehicle and/or the surroundings of the motor vehicle and/or the distance of the object to the camera system, in particular the sensor of the camera system, and/or to the additional camera system, in particular the sensor of the additional camera system.

An object detection device according to one of the preceding examples is wherein the control or regulating device changes the illumination of different areas in the interior of the motor vehicle based on the state of the object, the motor vehicle and/or the environment of the motor vehicle and/or the distance of the object to the camera system, in particular the sensor of the camera system, and/or to the additional camera system, in particular the sensor of the additional camera system.

A further object detection device according to one of the preceding examples is wherein the illumination, object localization and/or detection and/or activation of at least one of the lighting devices and/or camera systems is determined by the state of the object, preferably determined by the size, weight, respiration, heartbeat, temperature, acceleration, movement and/or physical fitness of the vehicle occupant.

An object detection device according to one of the preceding examples, wherein the lighting device of the camera system, the lighting device of the additional camera system, the additional lighting device, the camera system and/or the additional camera system is located in a dashboard, a center console, in particular a retractable or movable center console, a windshield, a roof, a headliner, a handle, an A-pillar, a B-pillar, a C-pillar, a door component, above a door, a housing, in particular a dome-shaped housing in the region of the center of the vehicle on the roof or roof lining, a display device, a vehicle occupant seat, in particular a head part, a foot part and/or an armrest of the vehicle occupant seat, a restraint system for the vehicle occupant, a positioning mechanism, in particular a motor-driven positioning mechanism, a trim and/or the device, in particular in the form of a mobile device of the object, is attached or integrated therein.

A further object detection device according to the preceding example is wherein the light device integrated in the display device comprises light sources distributed over a display area of the display device, wherein the light sources of the display device comprise groups of emitters and/or regions with different spectral emission ranges, which are designed to be able to provide light in at least a part of a spectral range used for object detection, and/or additionally comprise spectral emitters for the spectral range of object detection.

A further object detection device according to one of the preceding examples is wherein the optic system comprises guides and/or rotating wheels for exchanging and/or shifting the optical element and/or actuator means for inducing movements, and/or the optical element of the optic system comprises lenses, filters, adaptive optics, active optical elements and/or mirrors.

An object detection device according to one of the preceding examples comprises a computer or control unit which is designed to evaluate the electrical signals and/or the data, in particular by an object localization algorithm and/or an object detection algorithm.

An object detection device according to one of the preceding examples is wherein the control or regulating device is designed to control and/or coordinate the camera system, the additional camera system, the lighting device of the camera system, the additional lighting device, the lighting device of the additional camera system, at least one sensor, the device and/or the device, in particular comprising the mobile device.

An object detection device according to one of the preceding examples is wherein the illumination is determinable via the spectral frequency, amplitude, duration, in particular determined by pulse frequency and/or pulse length, polarization and/or intensity of the illumination, preferably the spectral frequency being above and/or below the visible light.

A method according to the invention for operating an object detection device according to one of the preceding claims is characterized by signal and/or data acquisition, object localization, adaptation of the illumination of the object, object detection and/or control command generation.

If the procedure is executed, background data acquisition and/or connection to the device, sensor and/or device is performed before signal and/or data acquisition.

A motor vehicle according to the invention, in particular a autonomous driving motor vehicle, is equipped with an object detection device according to one of the preceding examples and/or suitable for carrying out a procedure according to one of the preceding examples.

An embodiment of the motor vehicle may also be characterized by the fact that the device is designed for autonomous driving, and/or the control or regulating device for adjusting the position of the vehicle occupant in the vehicle interior, in particular via the vehicle occupant seat, the display device, the dashboard, the center console, in particular a retractable or movable center console, a vehicle opening, a warning device, a heating device, an air conditioning device, a navigation system, an audio system, a telephone system, a video system, a hologram system and/or the positioning mechanism is designed.

A motor vehicle according to any of the preceding examples may also be wherein the positioning mechanism is or can be brought into operative connection with the vehicle occupant seat, the display device, the dashboard, the center console, the vehicle opening, the warning device, the heating device, the air conditioning device, the navigation system, the audio system, the telephone system, the video system and/or the hologram system.

Advantageously, an object detection device for the interior of a motor vehicle according to the invention comprises at least one camera system and a control or regulating device.

The camera system is preferably a camera system that is designed to provide distance information for each image point, making object detection particularly precise. The camera system includes at least one camera and one lighting device to illuminate the environment to be detected. Preferably, the camera system is a depth image camera system, preferably a TOF camera. By emitting light and measuring the transit time of the reflection, the distance of individual pixels to the camera system can be determined. However, the use of other camera systems for spatial, three-dimensional detection, such as stereo cameras, light field cameras, triangulation systems, interferometry systems or scanner systems, especially a stripe light scanner, is also possible. The common feature of all used camera systems is the additional illumination to better detect objects at different distances.

If the lighting device of the camera system and/or an additional lighting device emits light in the non-visible spectral range, in particular in the infrared range, a vehicle occupant is not dazzled by the light of the lighting device of the camera system and/or the additional lighting device, while a high power can still be provided for object detection. It is particularly advantageous if different spectral ranges, in the visible and non-visible spectral range, can be used for object detection.

The camera system advantageously comprises a sensor, preferably an optical sensor such as a CMOS or CCD sensor, which can convert incident electromagnetic radiation into electrical signals, and an optic system to direct the electromagnetic radiation to the sensor.

To improve the depth of illumination, a lighting device, for example a lighting device of a camera system and/or an additional lighting device that does not need to be positioned inside or near the camera system, can provide an adjustable or variable light and brightness distribution to send light into different areas of the vehicle interior so that the required brightness for object detection is achieved in the different areas of the vehicle interior. The area to be illuminated or observed can comprise a near field and a far field. Near field and far field are here relative terms which are defined by the size and the shape of the area to be illuminated, whereby the near field comprises a partial area with a shorter distance to the lighting device and/or the camera system and the far field comprises a partial area with the further distance to the lighting device and/or the camera system. Near field and far field can also overlap in at least one area.

A variable light distribution can be caused, for example, by an adaptable optic system comprising at least one optical element such as one or more lenses. By changing the orientation and/or the distance of the optical elements of the optic system, the light emission of the lighting device can be adapted to different spatial and situational conditions. Alternatively or additionally, a lighting device comprising several independently controllable light sources can be used with an optic system. In this case the light sources are advantageously arranged together, especially as a matrix. The optic system provides different optic systems for the different light sources, so that each light source can be configured by the choice of optical elements in such a way that it can illuminate a certain area in a particularly advantageous way, either alone or combined with others. It may be provided that the alignment and/or the distance of the optical elements of the optic system does not have to be changed in order to achieve an illumination that is advantageous for object detection, but that the adaptable or variable light distribution is achieved by switching the different light sources on and off independently of each other and by operating them with different parameters, such as power, spectral range, pulse frequency, pulse length, polarization and other light source specific parameters. By using several light sources, it is thus possible to additively combine the required spatial illumination from several light sources. In particular, the illumination can be determined by the spectral frequency, amplitude, duration, especially determined by pulse frequency and/or pulse length, polarization and/or intensity of the illumination, whereby preferably the spectral frequency is above and/or below the visible light.

Optical elements include for example lenses, filters, adaptive optics such as deformable mirrors, active optical elements such as an optical modulator, in particular an acousto-optical modulator or an electro-optical modulator, and/or mirrors. Furthermore, the optic system may include guides and/or rotating wheels, such as a filter wheel, for exchanging and/or shifting optical elements, but also actuator means for inducing movements.

The control system is designed to receive and send data and to generate control commands based on raw and/or processed data and to pass them on to other devices. In particular, the control system is designed to control and coordinate different camera systems, lighting device, sensors and/or other devices in order to obtain suitable data for object localization and/or detection. In particular, TOF cameras require the coordination of the light emission of lighting device with the image acquisition of the camera.

A computer or control unit can also be provided. The computer or control unit evaluates data supplied by the control unit and then passes this data on to the control or regulating device and/or other devices. The computer or control unit can also be a subunit of the control unit and/or be already integrated into it. Various evaluation algorithms can be used to evaluate the data, in particular an object localization algorithm and an object detection algorithm. Advantageously, the object localization algorithm also performs an object classification.

It may also be provided that individual areas of the lighting device are activated depending on the area in which the expected object is positioned. For this purpose it may be intended that a first image or a few first images of the camera system can be used for a rough object localization. The control unit can selectively activate a number of suitable sensors, camera systems and/or lighting devices and send the obtained data to the computer or control unit. The computer or control unit can process the data using an object localization algorithm and send the object localization result back to the control unit. In the case of a localized object, such as a vehicle occupant, the areas where relevant data for object detection can be obtained can then be examined more closely. These could be, for example, the areas around the palms of the hands, the feet, the upper body, the shoulders and/or the head of the vehicle occupant. For this purpose, the lighting device of the camera system and/or the additional lighting device is then activated based on the evaluated data of the object localization in order to be able to preferentially illuminate the relevant areas of the object to be detected. Furthermore, it may also be intended that based on other vehicle data, such as sensor data on seat occupancy, seat position and seat orientation as well as data on physical characteristics and peculiarities of the vehicle occupant, the object localization and/or detection is performed and/or the lighting devices are activated. Particularly advantageous is the use of data on the orientation, position, acceleration, temperature, the state of the vehicle occupant's seat and/or data from the vehicle occupant, such as weight, breathing, heartbeat, temperature, acceleration and/or movement, in order to perform or stimulate object localization and/or detection. In particular, data obtained by sensors, such as a weight sensor and/or an acceleration sensor, which indicate movement and/or weight displacement of a vehicle occupant can be used to initiate object localization and/or detection. Object detection can be performed by the computer or control unit using an object detection algorithm.

In particular, sensors can be designed to measure pressure, temperature, acceleration, velocity, electromagnetic fields, gravitation, light, gas composition, vibrations, ultrasound, radio waves, microwaves, cosmic rays and their various properties.

A particularly advantageous design of the lighting device can also be realized by a display device. A display device is primarily used to provide information to the vehicle occupant and secondarily to receive input from the vehicle occupant, for example to control the display device or to control other functions of the vehicle. The display can perform several additional functions. First, a display device can act as a light source by emitting light to illuminate the area in front of the display device. If an object, such as the head of a vehicle occupant, is in the lighting field of the display device, it is additionally illuminated and the camera system can detect the object by means of the additional light. On the other hand, the display device can also be equipped with a camera and/or a camera system. By controlling the control or regulating device, the display device and the camera system of the object detection device can perform the object detection together and/or separately. This is especially advantageous if the camera system cannot perform the object detection due to the position of the vehicle occupant and/or blocking objects because the object to be detected is not facing the camera system or is not completely within the detection range of the camera system.

By positioning the display device, it can normally at least cover the area of the head of a vehicle occupant. Alternatively or in addition, the display device may have an additionally integrated or externally positioned lighting device. In this case, it is particularly advantageous if the display device provides light sources for object detection distributed over its display area. In the case of a display device based on a matrix-like distribution of light sources, where the light sources comprise groups of emitters and/or regions with different spectral emission ranges, additional spectral emitters for the spectral range of object detection can be introduced and/or the existing groups of emitters and/or regions that can provide at least part of the spectral range for object detection can be activated. Such an emitter for a display device can also represent or comprise an absorbing region in which the spectral composition of the light emitted by a background light source is determined by the absorbing region. Such an emitter can also comprise a reemission triggered by the absorption of light, in particular the light of a background light source, in a spectrum which differs at least in parts from the absorbed light. A combination, especially a stacking, of emitting, absorbing and reemitting regions is also possible.

The motor vehicle comprises at least one, advantageously a multitude of different, devices, in particular a device for autonomous driving. Devices and/or settings of the motor vehicle, which can be controlled, checked and/or whose setting and/or state can be changed, comprise in particular the position of the vehicle occupant in the vehicle interior, the vehicle occupant seat, the display device, the dashboard, a center console, in particular a retractable or movable center console, a vehicle opening, a warning device, a heating device, an air conditioning device, a navigation system, an audio system, a telephone system, a video system, a hologram system and/or a positioning mechanism.

The device for autonomous driving is designed to autonomously control and operate the vehicle, in particular all devices of the motor vehicle. The vehicle occupant can also access the control and operation of the devices, in particular via the control or regulating unit. It may happen that the control unit can change the settings that the device has made for autonomous driving. It is also possible that the control unit cannot change the settings made by the device for autonomous driving. This situational aspect of vehicle control is intended to prevent operating errors and disasters caused by incorrect or faulty operation. At the same time, it also opens up the possibility of correcting errors triggered by the device for autonomous driving. In accordance with the invention, a method for operating an object detection device for the interior of a motor vehicle, which in particular comprises a plurality of camera systems and/or lighting devices, is supplied, in which for the detection of at least a first input treatment of a user, an object localization and an object detection is carried out so that the object is detected by the object detection device despite distance and/or obscuration.

A motor vehicle according to the invention may be equipped with one or a plurality of display devices, at least one sensor for detecting a contactless input treatment and a control or regulating device which is designed to carry out a process of the type described according to the invention.

BRIEF DESCRIPTION OF THE DRAWINGS

In the following, preferred embodiments of the present invention are explained in more detail with reference to schematic drawings, in which FIG. 1a, 1b exploded view and a side view of an exemplary lighting device.

DETAILED DESCRIPTION

Figure 1A:
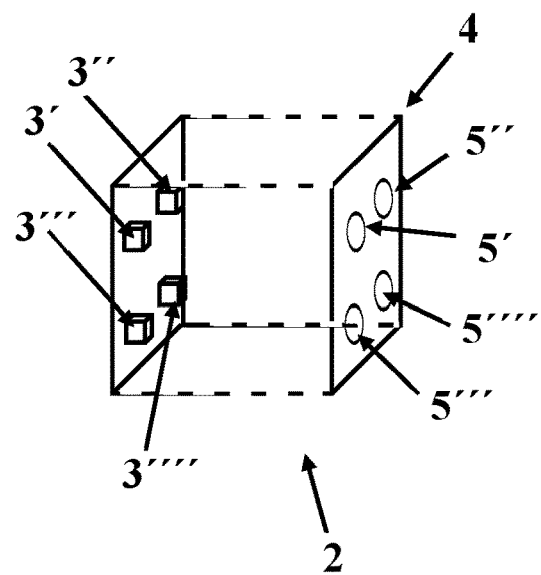
Figure 1B:
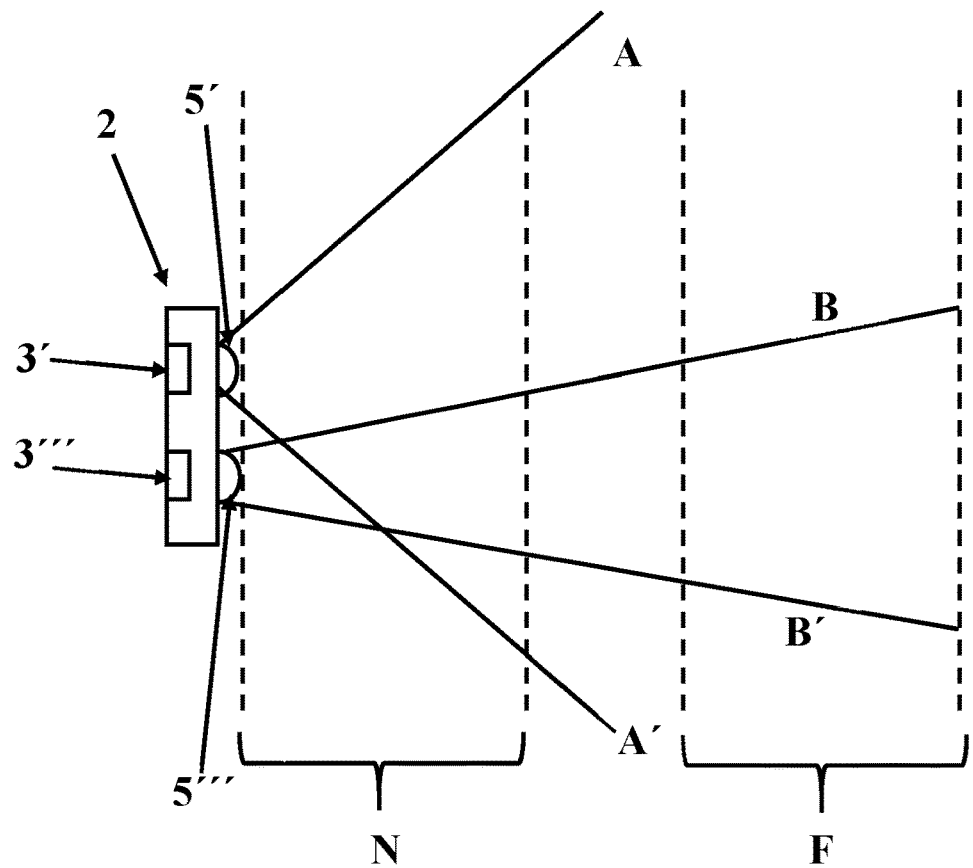

A lighting device 2 suitable for use in an object detection device of the invention is shown in FIGS. 1a and 1b, namely with a matrix of light-emitting diodes (LED) 3' to 3'''' and thus with a matrix optics, such as in a lens array. The lighting device 2 comprises the light sources 3' to 3'''' shown in the exploded view in FIG. 1a with the optical elements 5' to 5'''' of an optic system 4, each of which is connected downstream of the light sources 3' to 3''''. Thus, for example, a near field can be illuminated by activating the light source 3' and a far field by activating the light source 3'''. As indicated in the side view in FIG. 1b, the light beams widen with increasing distance from the light source 2. The area illuminated by light source 3' is here limited to the area between two illumination limits A and A', while the area illuminated by light source 3''' is limited to the area between illumination limits B and B'. Because the available light intensity is distributed over a larger spatial field, the depth illumination decreases at the expense of the illumination field size. Thus, although a large spatial field perpendicular to the light propagation direction in the near field N can be illuminated with the light source 3', the light intensity is no longer sufficient to illuminate the depth range in the far field F in order to be able to perform object detection. On the other hand, the 3''' light source can be used to illuminate the depth range in the far field F, but the illuminated range in the near field N is smaller than with the 3'' light source, so that a near object may not be completely detected. The light sources 3'' and 3'''' can be used at medium distances to achieve increased illumination. Alternatively, at least one of the light sources 3'', 3'''' can also be used to illuminate the area or a partial area outside the illumination range of the light source 3''' in far field F. By using several light sources, the required spatial illumination can be composed of several light sources.

It goes without saying that light propagation always takes place in three-dimensional space and not, as shown here as an example, in a two-dimensional plane.

Even if the arrangement of light sources 3' to 3'''' in FIGS. 1a and 1b is shown in a flat plane and a regular pattern, a curved or otherwise shaped surface may also be provided to accommodate light sources 3' to 3''''. Thus, the direction of the light emission and the distance of the respective light source 3' to 3'''' to the respective optical element 5' to 5'''' can be preset. The number of light sources can also be increased or decreased, depending on the area to be illuminated and the available installation space.

The optical elements 5' to 5''' of the optic system 4 can also be arranged on a curved or otherwise shaped surface in order to optimally illuminate the area to be illuminated.

Advantageously, a base plate for holding the light sources and/or the optical elements can be produced in an injection molding process, in particular in a multi-component injection molding process, at least in a 2K injection molding process.

Figure 2:
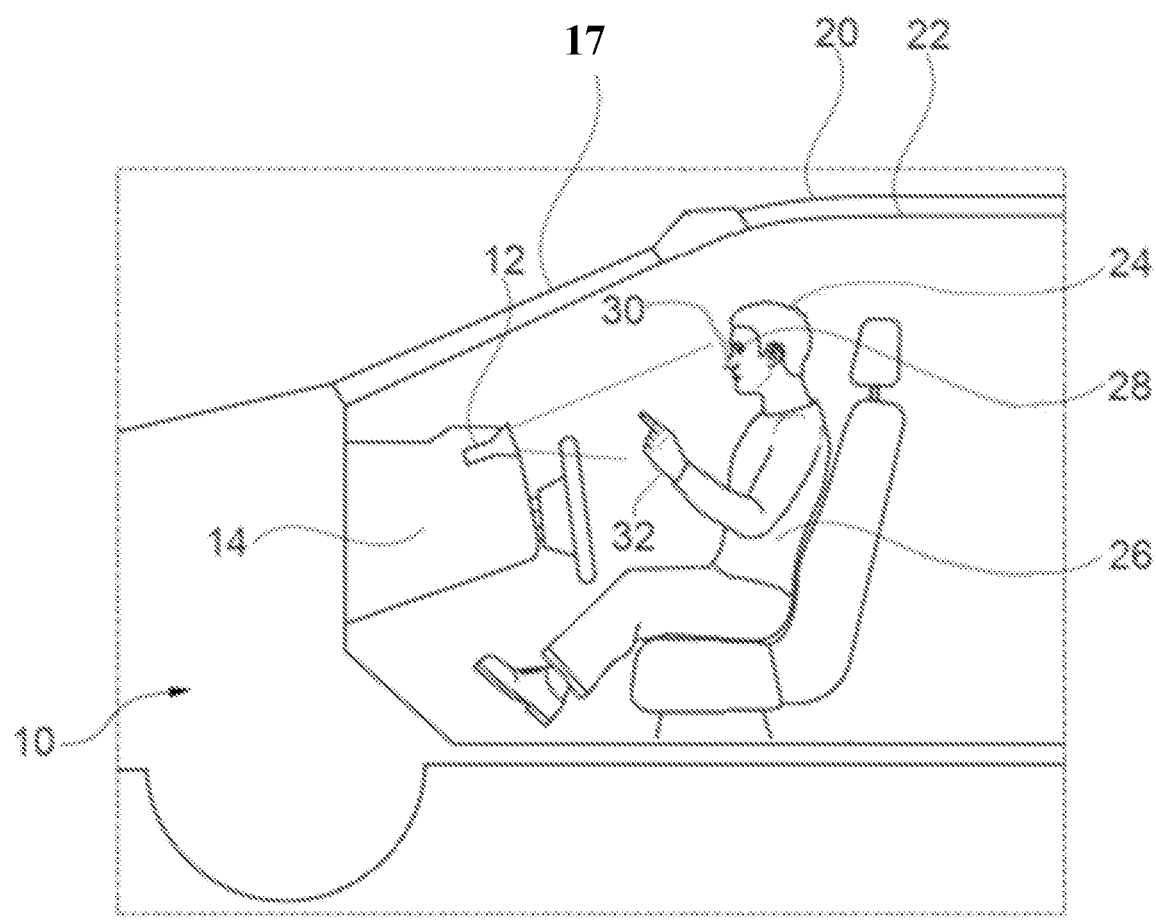
FIG. 2 shows a partial side section view of a motor vehicle with a first design example of a device and vehicle occupants according to the invention.

A motor vehicle shown in FIG. 2 and designated as 10 in its entirety, according to the invention, comprises a camera system 12, which is arranged in a dashboard 14, for example.

If a vehicle occupant 26 is in a normal sitting position, as for example shown in FIG. 2 by the driver of the vehicle 10, then an object detection can be performed with the camera system 12. In this way, both the position and movement of a hand 32 of the vehicle occupant 26 and the position and movement of a head 24 of a vehicle occupant 26 can be observed. For example, the camera system 12 detects the eyes 28 of the vehicle occupant 26 as well as his entire head 24. The position of the eyes 28 can be monitored by object detection of the eyes 28 as a whole. However, a finer analysis can also be performed, in which the position of pupils or iris of eye 28 is observed. To determine the position and orientation of the head 24, the camera system can observe 12 particularly easily detectable parts of the head, such as the nose 30 of the vehicle occupant 26.

The combination of the detection of head position, eye position, facial expressions and gestures of the vehicle occupant 26 enables a particularly precise non-contact control of the vehicle 10 and its functions.

However, especially with large vehicle occupants, but also with rearwardly inclined seating positions, the distance between the vehicle occupant and the camera system 12 may become so large that reliable gesture and/or head detection is no longer guaranteed. Especially with TOF cameras, where the lighting device is often housed in the housing with a camera or in the immediate vicinity of the camera, this is often due to the lack of light output from the lighting device.

Figure 3:
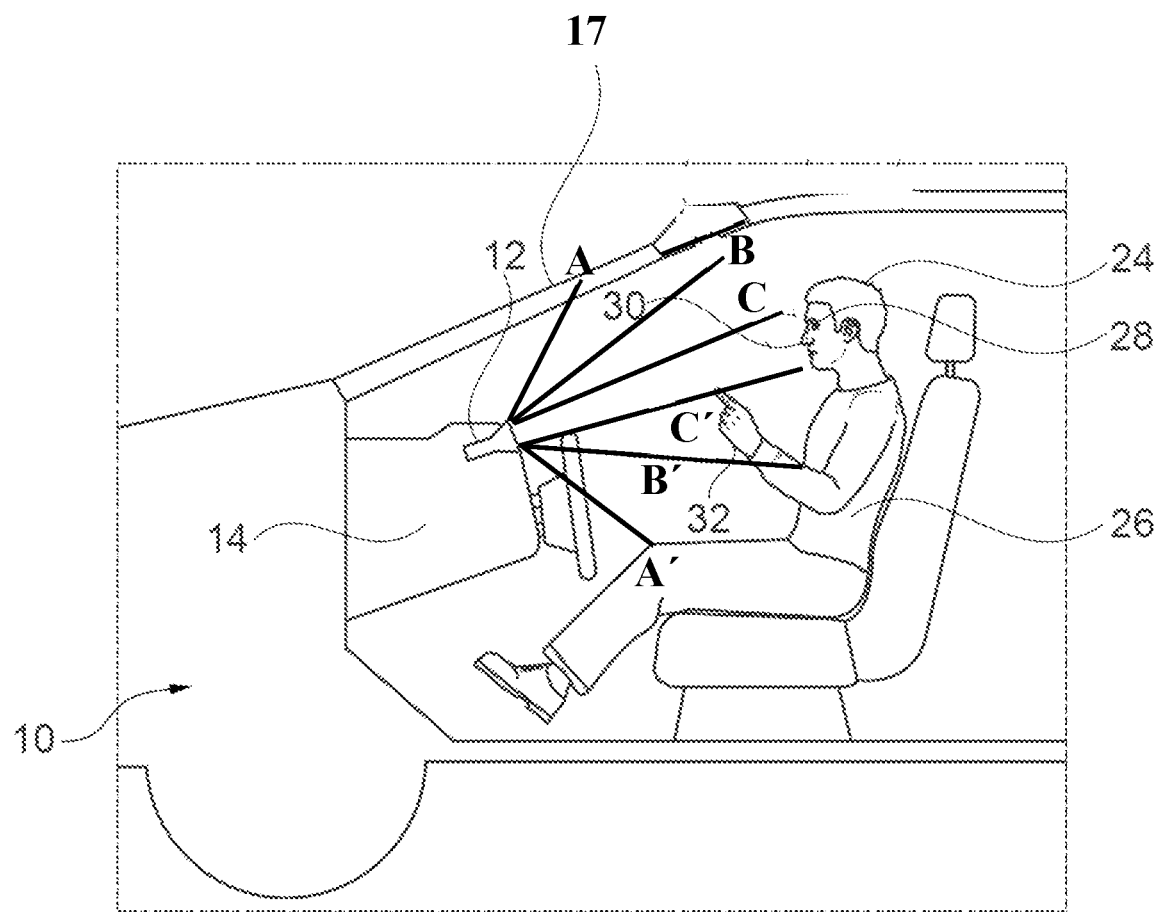
FIG. 3 shows a partial side section view of a motor vehicle with a second design example of a device and vehicle occupants according to the invention.

FIG. 3 shows a camera system 12 with a lighting device that can illuminate different areas analogous to the lighting device shown in FIG. 1b. As an example, three different areas are shown here, each of which is limited by the illumination limits A and A', B and B' as well as C and C'. Either different light sources with a fixed optic system can be used as in the example shown in FIG. 1b, but a single light source with adaptive optics and/or movable optical elements, or a combination of both systems is possible.

Figure 4:
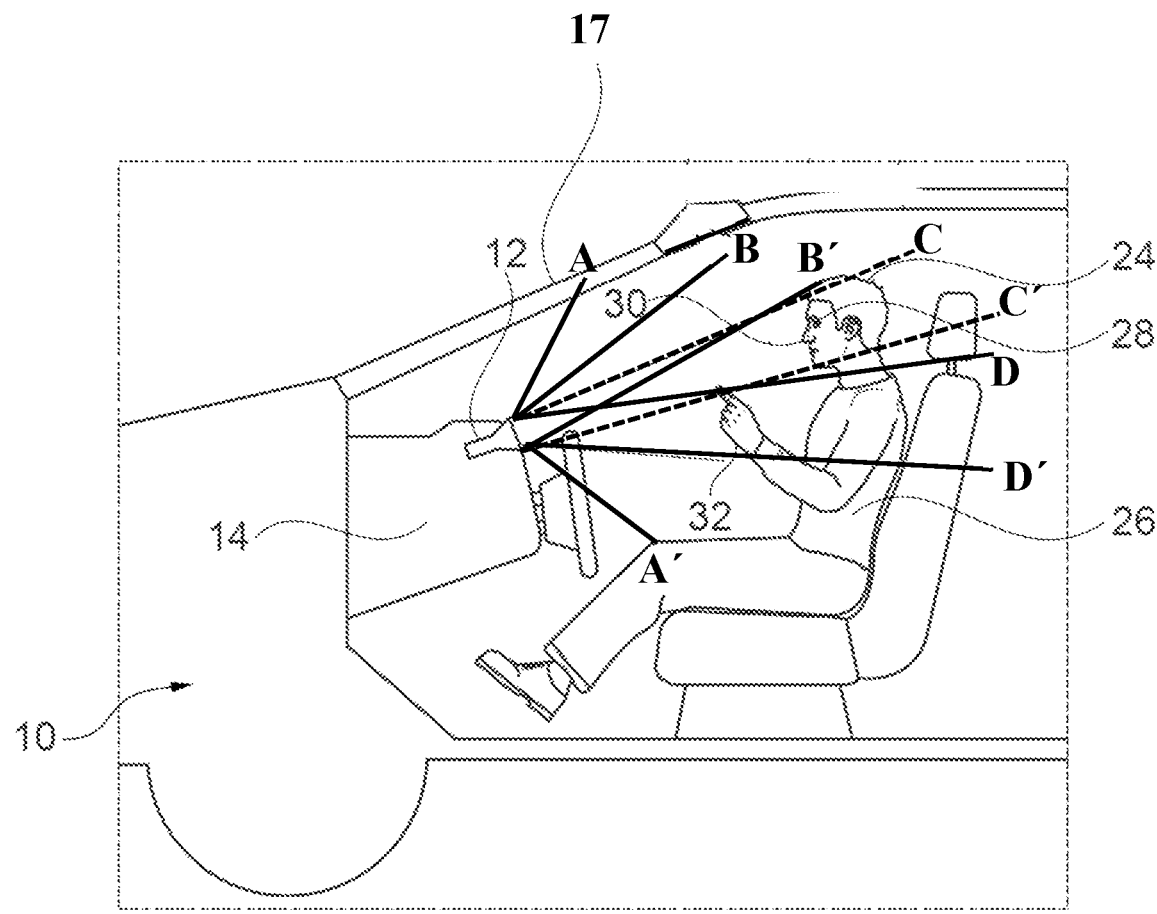
FIG. 4 shows a partial side section view of a motor vehicle with a third example of a device and vehicle occupants according to the invention.

FIG. 4 shows a camera system 12 with a lighting device, which again can illuminate different areas analogous to the lighting device shown in FIG. 1b, whereby here the illumination of the depth range in the far field is additively combined by different light sources and/or realized by movable light sources and/or optical elements. As an example, four different areas are shown here, each of which is limited by the illumination limits A and A', B and B', C and C' and D and D'

Figure 5:
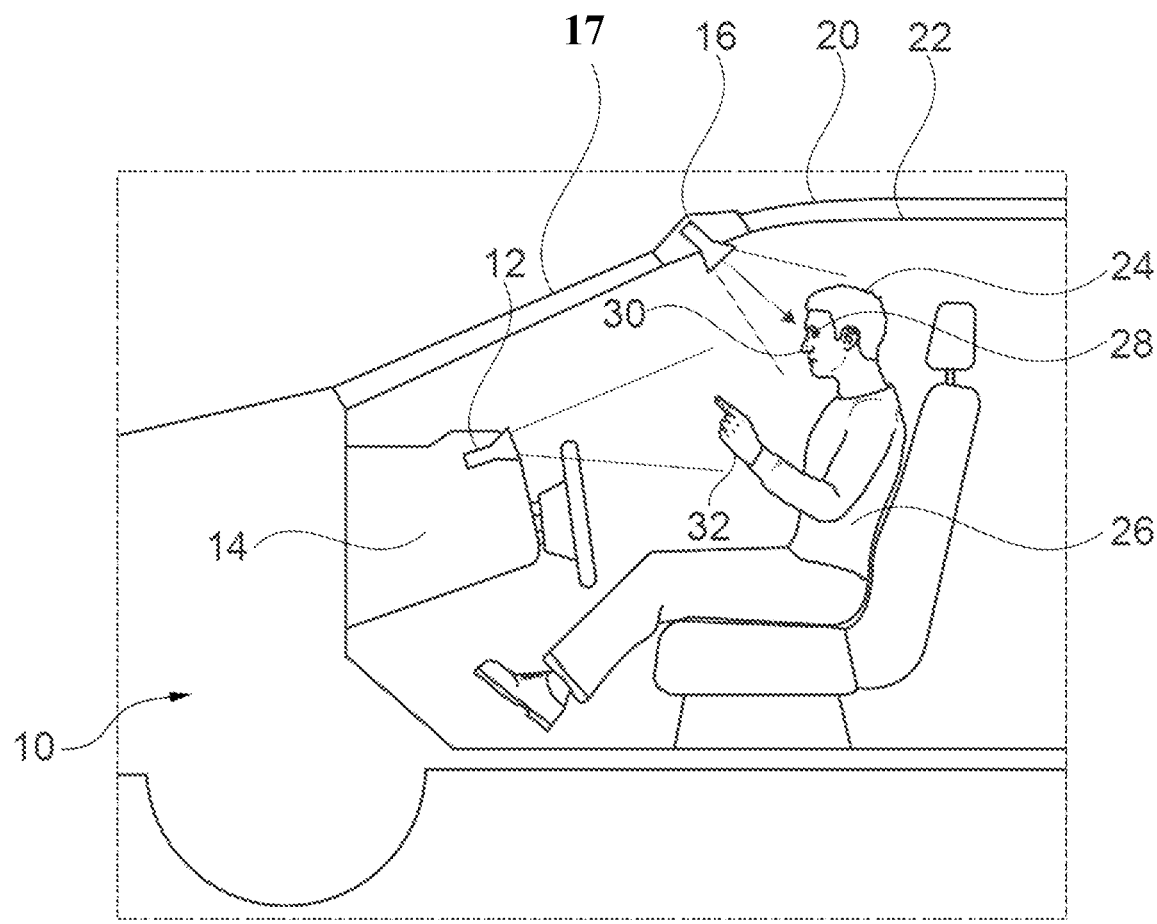
FIG. 5 shows a partial side section view of a motor vehicle with a fourth design example of a device and vehicle occupants according to the invention.

As shown in FIG. 5, a lighting device 16 installed, for example, at the transition between a windshield 17 and the roof 20 of the motor vehicle 10 can be used to illuminate the area which is no longer sufficiently illuminated by the lighting device of the camera system 12. Camera system 12 and lighting device 16 are advantageously controlled by a common control or regulating device in order to coordinate the activation of the lighting devices and the signal and/or data recording. By the light of the lighting device 16 the object detection in a larger spatial environment becomes possible. Alternatively, the lighting device 16 can also be integrated into an interior rear-view mirror (not shown) of the motor vehicle 10.

Figure 6A:
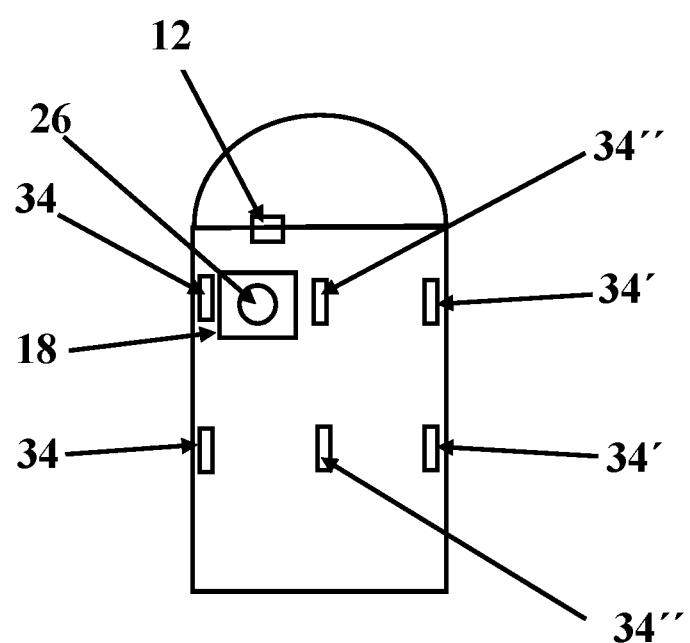
FIG. 6a-d shows a top view of a motor vehicle with a fifth to eighth example of the device according to the invention.

A different design of the lighting device 16 is shown in FIGS. 6a to 6d. In this case a lighting device 16 illuminates the vehicle occupant 26 in the vehicle occupant seat 18 at least partially from the side. For example, it may be intended that the lighting device 16 is installed in a handle 34, for example above the driver's door, as shown in FIG. 6a. Such a lighting device may also be provided in the other grab handles 34' on the passenger side. In addition, it may be intended to install additional grab handles 34" in a vehicle interior in order to facilitate the movement and/or securing of vehicle occupants in an at least partially autonomous motor vehicle, which can then of course also be equipped with corresponding lighting devices 16.

Figure 6B:
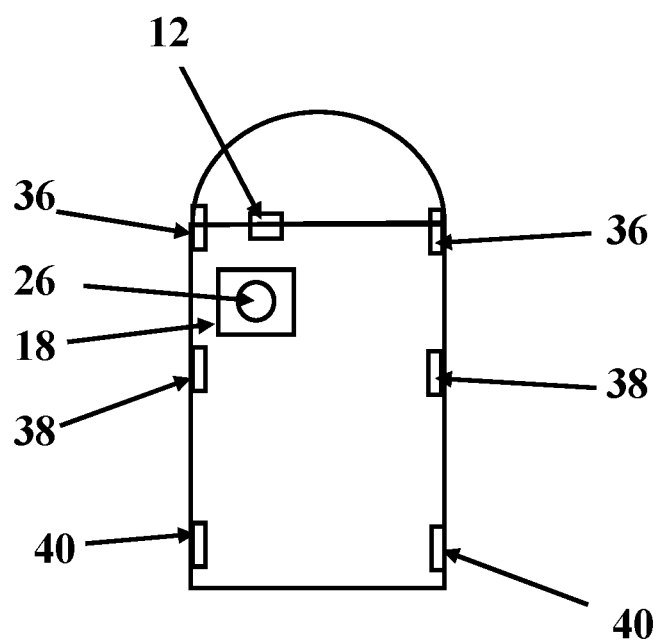

In FIG. 6b it is shown that the lighting device 16 can also be integrated in a part of the A-pillar 36, the B-pillar 38 and/or the C-pillar 40 of the motor vehicle 10.

Figure 6C:
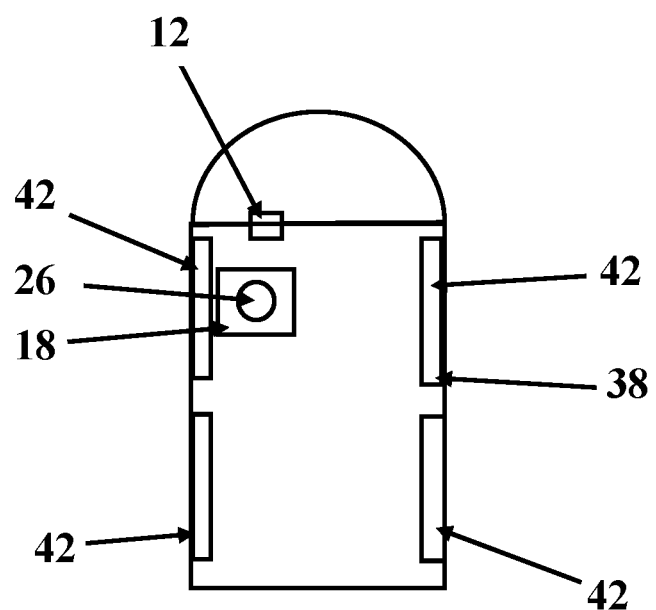

In FIG. 6c it is shown that the lighting device 16 can also be integrated in the area of the door, door frames, windows, window frames and the corresponding covers, especially the cladding, here collectively referred to as door components 42.

Figure 6D:
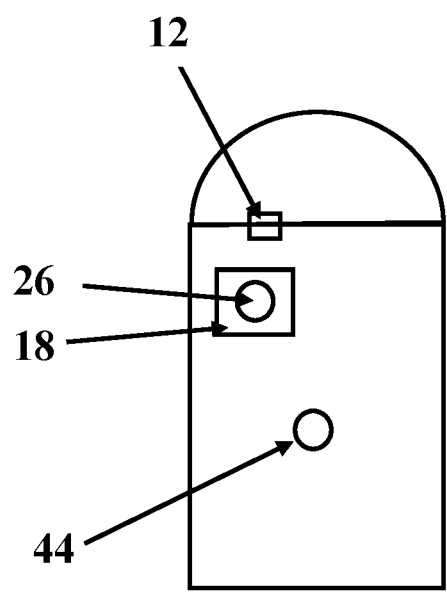
Figure 7:
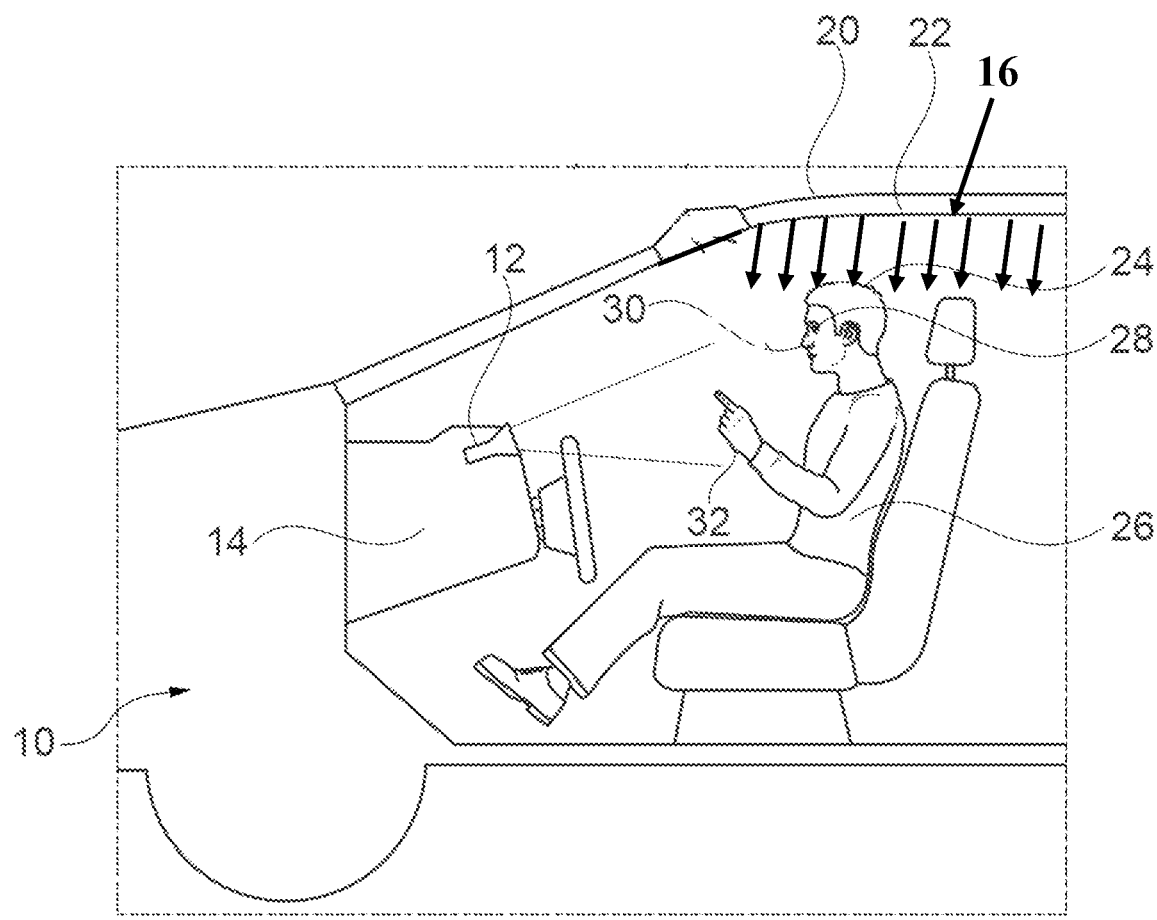
FIG. 7 shows a partial side section view of a motor vehicle with a ninth design example of a device according to the invention and vehicle occupants.
Figure 8:
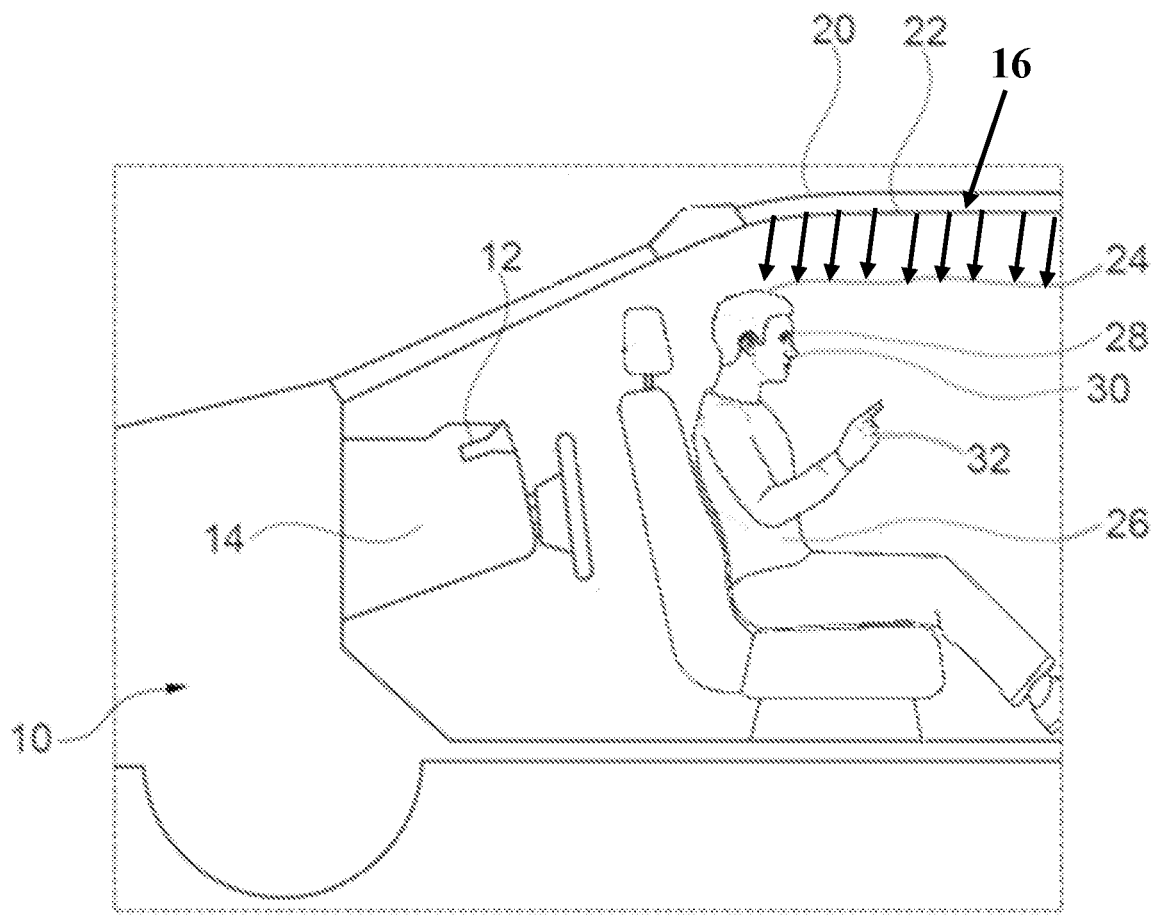
FIG. 8 shows a partial side section view of a motor vehicle with a tenth example of a device and vehicle occupants according to the invention.
Figure 9:
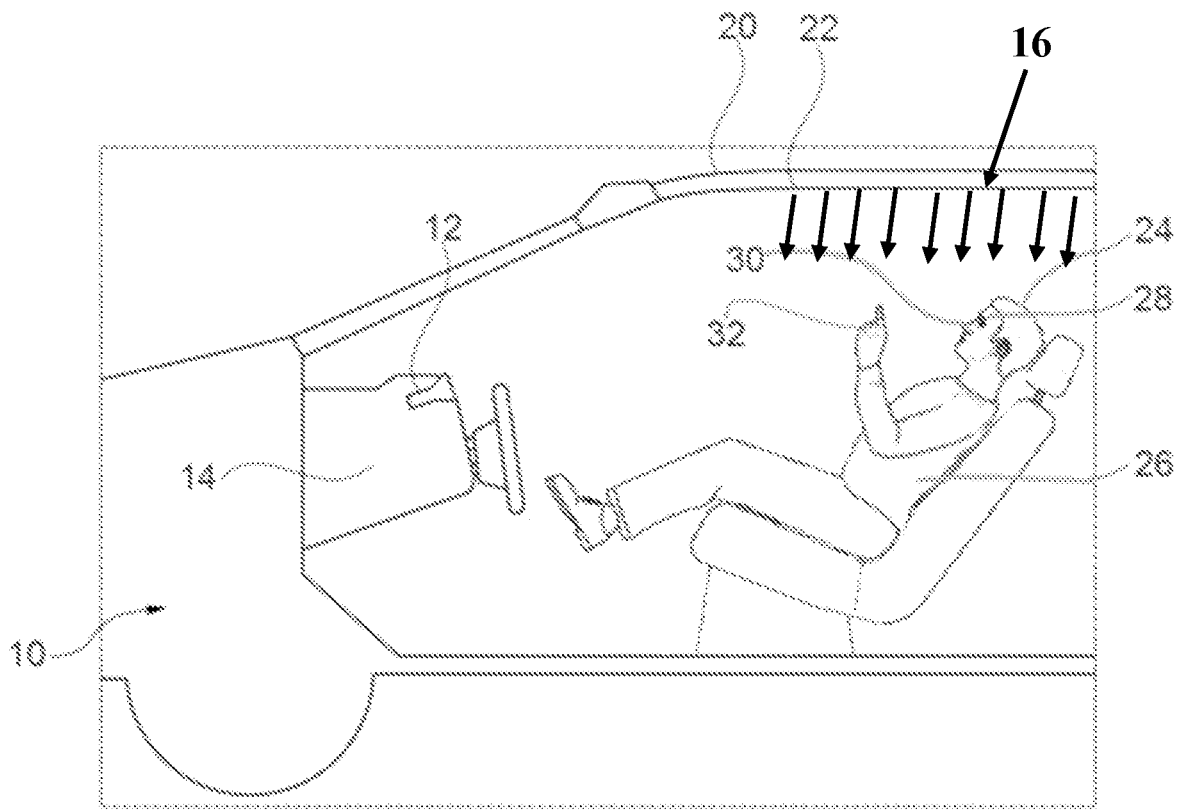
FIG. 9 shows a representation of a motor vehicle with an eleventh example of the device according to the invention.
Figure 10:
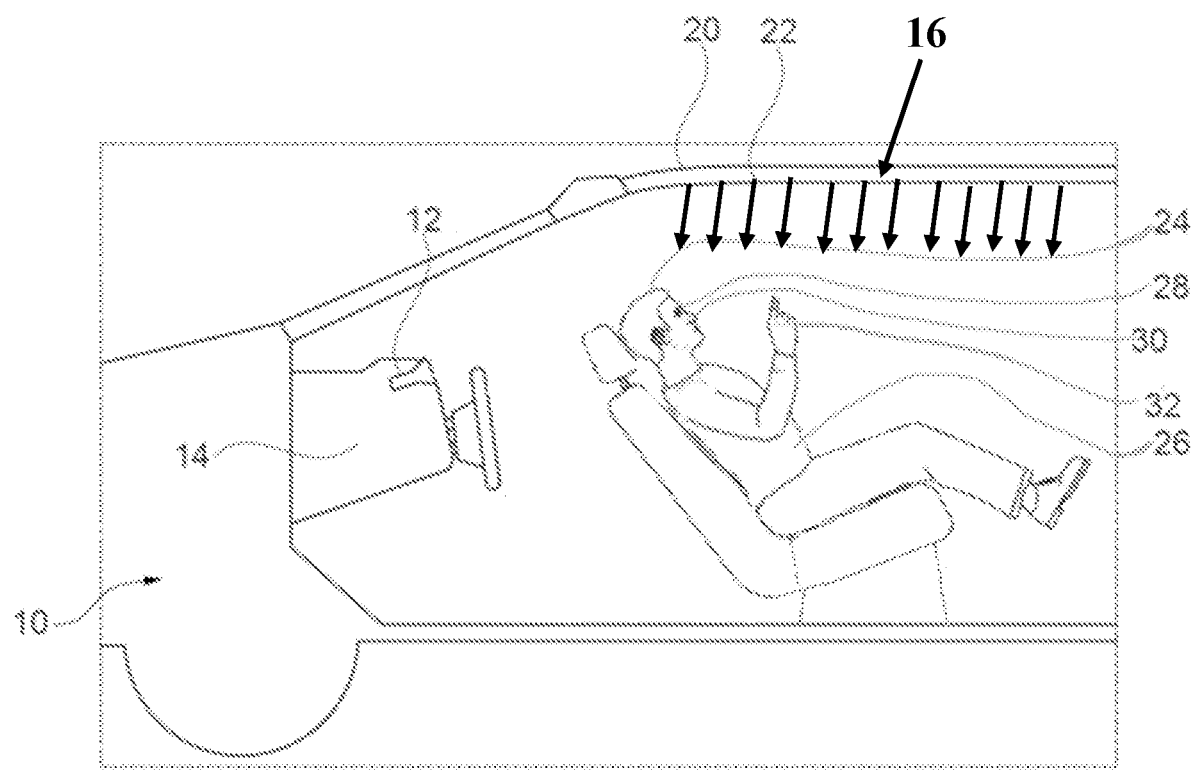
FIG. 10 shows a representation of a motor vehicle with a twelfth example of the device according to the invention.
Figure 11A:
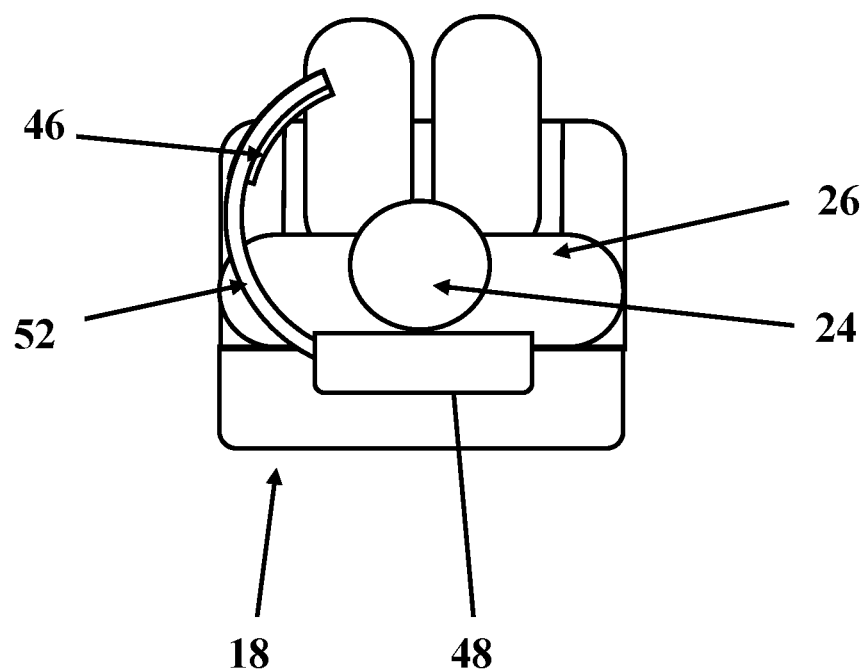
FIG. 11a-d each shows a plan view of a vehicle occupant seat of a motor vehicle with a thirteenth example of the device according to the invention.
Figure 11B:
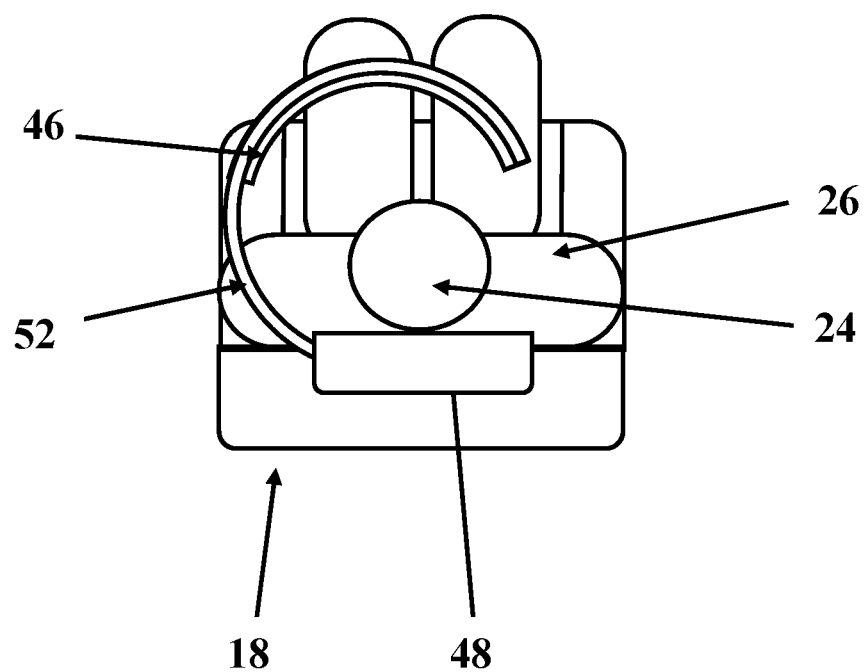
Figure 11C:
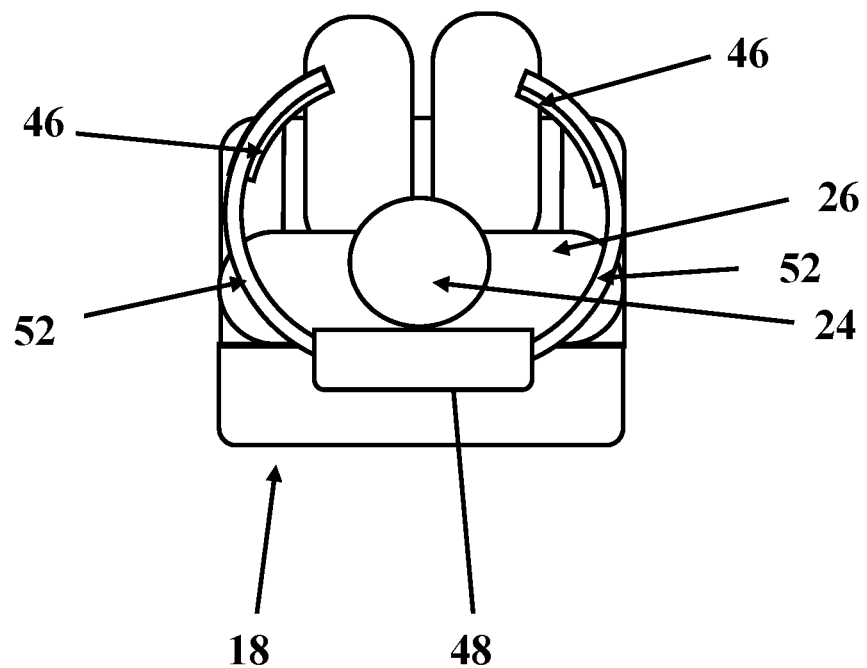
Figure 11D:
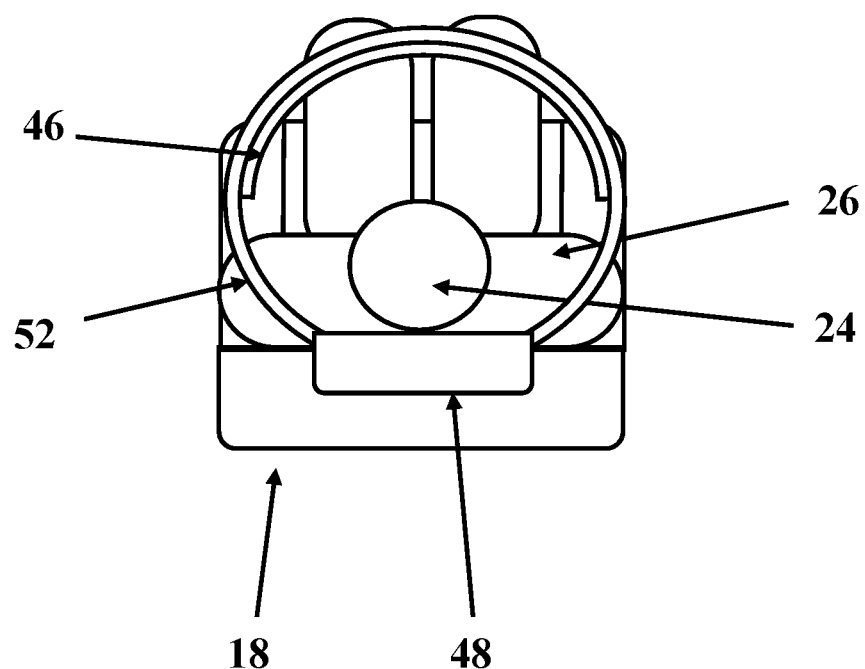

Finally, FIG. 6d shows a lighting device 16, which is located in the center of the vehicle on the ceiling, i.e. roof 20 or headliner 22. This positioning makes it possible to illuminate the central area of the vehicle interior particularly well. Advantageously, the lighting device 16 is located inside a dome-shaped housing 44, from where the lighting device 16 can illuminate up to 360° in a vertical plane and up to 180° in a horizontal plane. This can be done via several permanently installed lighting units, or the installed lighting unit can move to change the direction of light propagation.

In FIGS. 7 to 10, the lighting device 16 is integrated in the headliner 22. On the one hand, this can be done by means of lighting devices that are distributed over the area of the headliner 22, on the other hand, the entire headliner 22 itself can be designed as lighting device. The integration of the lighting device 16 into the headlining 22 allows to illuminate the seating and lying positions shown in FIGS. 8 to 10, which can be assumed by vehicle occupants 26 and in connection with autonomous and/or non self-controlled vehicles. In particular, however, sitting and/or lying positions not shown can also be assumed. For example, the vehicle occupants can also orient themselves at right angles to the direction of travel of the motor vehicle and/or lie on their side or stomach in the vehicle occupant seat. In the prone position, the vehicle occupant seat, in particular the head restraint of the vehicle occupant seat, may have an area, in particular a recess or hole, to accommodate the head of the vehicle occupant without covering his or her face. In such a position, the vehicle occupant shall be able to put his or her head down without his or her breathing and/or vision being impeded by the vehicle occupant seat. Lighting device, camera systems, devices such as loudspeakers and/or microphones and/or sensors can also be fitted and/or integrated in the recess or hole.

It can also be provided that the headliner 22 has a cover that is at least partially transparent for the spectral range of the light 16, so that the light 16 itself is not visible, while the light of the light 16 can still illuminate the room. Advantageously, the cover is essentially completely transparent for the spectral range of the lighting device, while it is essentially not transparent in the visible spectral range.

By using several of the above lighting devices at different positions, a particularly good illumination of the vehicle interior can be achieved.

Figure 12A:
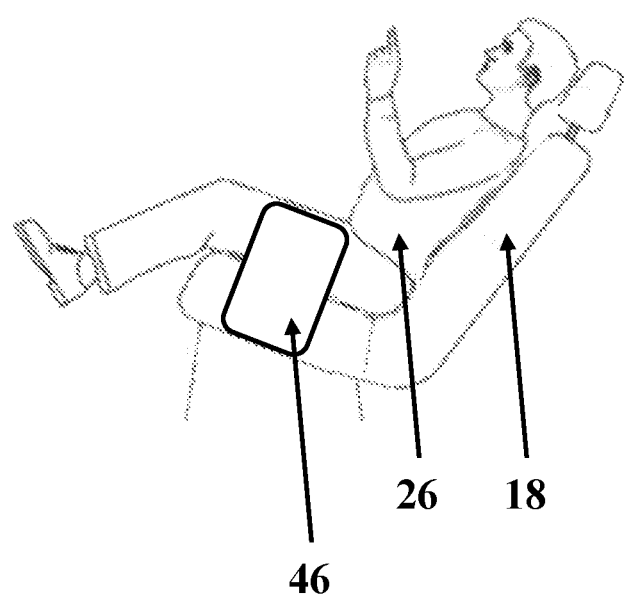
FIG. 12a-c each shows a representation of a vehicle occupant seat of a motor vehicle with a fourteenth example of the device according to the invention.
Figure 12B:
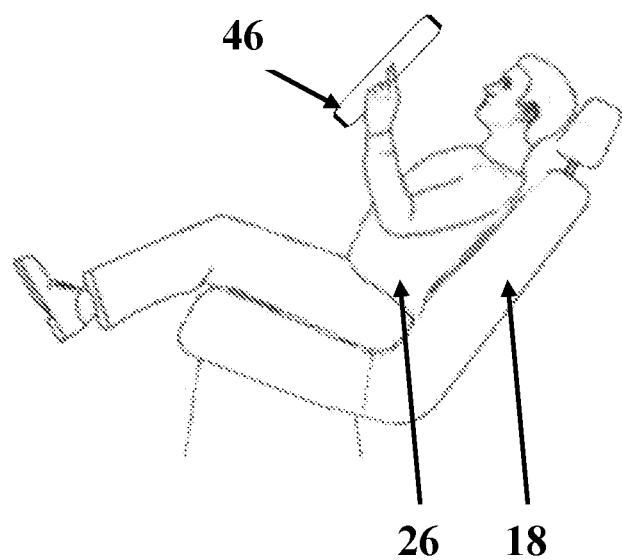
Figure 12C:
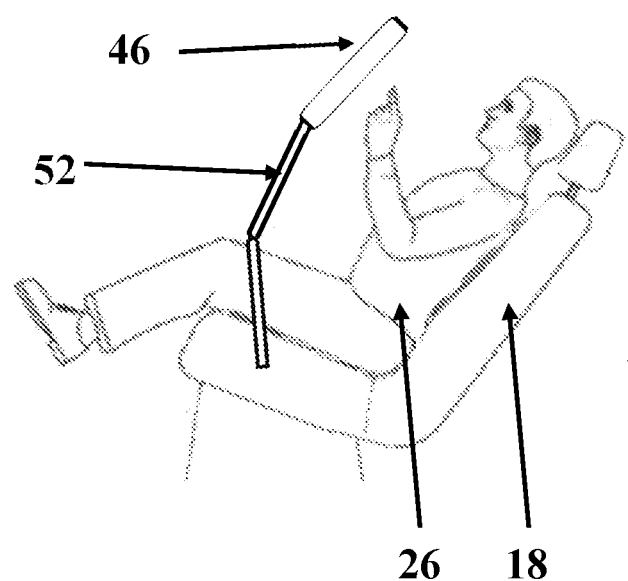

Lighting devices that can be used in accordance with the invention are integrated in or in the form of display devices 46 are shown in FIGS. 11 to 12. FIGS. 11a to 11d show four different variants of indicator devices 46 which can be positioned near or in front of the head 24 of a vehicle occupant 26. In this case, the display device 46 is advantageously mounted in or at the head section 48 of the vehicle occupant seat 18 and can be brought manually or automatically into a position via a positioning mechanism 52 in order to provide the vehicle occupant 26 with information and/or to support the object detection by the lighting device and/or by the camera system. Rotation and/or rotation of the display device 46 or the positioning mechanism 52 to adapt to the angle and field of vision of the vehicle occupant 26 is also possible.

In addition or alternatively, it may also be provided that a lighting device without display device is positioned by a positioning mechanism 52 in such a way that it can support object detection. For this purpose, the lighting device may also be positioned on a side facing away from the display device, for example to illuminate gestures of vehicle occupants.

In FIG. 12a, an indicator 46 is positioned on the vehicle occupant seat 18, for example, next to or on an armrest 50, allowing the vehicle occupant 26 to manually remove the indicator 46 from a holder and hold it in their hands, as shown in FIG. 10b. Alternatively or additionally, the display device 46, as shown in FIG. 10c, can also be positioned in the field of vision of the vehicle occupant 26 via a positioning mechanism 52 in such a way that the vehicle occupant 26 does not need any hands to hold the display device 46. The positioning of the display device 46 can be done manually and/or motor-driven. The indicator 46 may also be formed in, or attached to, a part of the vehicle occupant seat 18, for example an armrest 50, a head restraint 48, a foot restraint and/or a restraint system, such as part of a seat belt system (not shown). The vehicle occupant restraint system is also designed to be able to secure the occupant in all sitting or reclining positions. It may also be provided that a lamp without indicator is positioned by a positioning mechanism 52 in such a way that it can support object detection.

A positioning mechanism 52 may include at least one joint to enable and/or perform a rotation about a pivot point. Alternatively or additionally, a positioning mechanism 52 may also enable and/or perform a linear movement, for example in the form of a rail or an extendable rod. In particular, a positioning mechanism 52 may enable and/or perform a combination of different movements and/or forms of movement. The positioning mechanism 52 thereby has at least a first end position and a second end position, and can be transferred by at least one movement between the first and the second end position. A first end position may be, for example, a folded state in which, for example, the device, light source, camera system, display device and/or device is positioned in a storage space or initial position, for example on the vehicle occupant seat, center console or headlining. If necessary, the device, light source, camera system, display device and/or device can then be moved to a second end position by performing a movement with the positioning mechanism 52. This may then result, for example, in the device, light source, camera system, display device and/or device being positioned in the field of vision of a vehicle occupant and remaining there when no further movement is made or required. In particular, the positioning mechanism 52 may be, or may be capable of being, operatively connected to the vehicle occupant seat, the display device, the dashboard, the center console, the vehicle opening, the warning device, the heating device, the air conditioning device, the navigation system, the audio system, the telephone system, the video system and/or the hologram system.

It may also be particularly advantageous to design the display device and/or lighting device as part of a foot section of the vehicle occupant seat. If the vehicle occupant occupies a reclining position, the display device and/or lighting device designed into or attached to the footrest of the vehicle occupant seat can improve and/or perform object detection.

In addition, the motor vehicle 10 may include a number of indicators not shown in the figures, which may, for example, be integrated in the dashboard 14, may be a head-up display on the windscreen 18, or may be installed in a headlining 22 or other interior trim parts of the motor vehicle 10, in particular around the vehicle doors. Furthermore, the windows of the motor vehicle 10 may also be designed as a display device and/or lighting device. In this context, it is advantageous to use a display device and/or lighting device which, when switched off, is essentially transparent at least in some areas, whereas when switched on it provides information and/or light. For example, organic light emitting diodes (OLED) can be used for this purpose. However, display devices can also be used which completely replace the windows of the motor vehicle and on which, for example, the image of the surroundings captured by camera systems can be shown. Other display devices include a projection surface, a head-up display, a flexible OLED display, a liquid crystal display, photometric fabric and/or photometric films, in particular in the form of a headliner monitor, interior trim monitor, left door monitor, left main monitor, right main monitor and/or right door monitor, which can be arranged in a dashboard, on a windscreen, in a headliner and/or in the center console.

Instead of or in addition to the lighting devices mentioned in all versions, a camera and/or camera system can also be used at the respective positions to perform and/or improve object detection. This is particularly advantageous if the object is no longer in the original detection range of the camera system due to a change in the seat position and seat orientation as well as masking.

Furthermore, it may be intended that the control or regulating device for object detection accesses data, sensors, cameras and/or lighting device from other devices, such as external devices and/or other vehicle device. For example, the control system may access a mobile terminal device belonging to and carried by a vehicle occupant to obtain additional data, such as control commands, profile data or sensor data, and/or use cameras and/or lighting device of the mobile terminal device. It is also possible to obtain data from vehicle device or to control vehicle device to support and/or perform object detection. Examples of such in-vehicle device can be sensors, for example integrated in the vehicle occupant seat, which measure the orientation, position, acceleration, temperature, the state of the vehicle occupant seat and/or data from the vehicle passenger, such as weight, respiration, heartbeat, temperature, acceleration and/or movement. Other beneficial vehicle devices may be memory devices, data transmission and/or information interfaces that provide a profile with the data, such as physical data, in particular facial characteristics and/or preferred settings of the vehicle occupant, and may be used for object detection.

Figure 13:
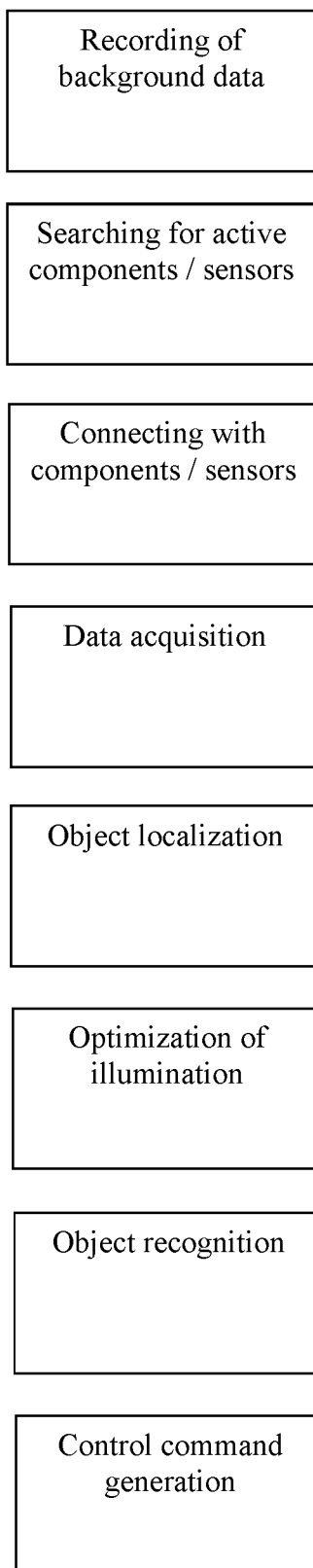
FIG. 13 show a block diagram of a process according to the invention.

A method for operating an object detection device according to the invention is shown as an example in the block diagram in FIG. 13. The method comprises at least the steps of signal and/or data acquisition, object localization and object detection. Based on the object localization, the illumination of the vehicle interior can then be optimized, if necessary, in order to perform the object detection. The commands detected by the object detection can then be executed. The object localization and the object detection are realized by appropriate algorithms from the provided data. The optimization and/or variation of the illumination can also take place additionally or alternatively before the object localization. This is especially important, if without such a change of illumination not enough data for a first object localization can be obtained.

Preferably, background data is recorded before or during vehicle activation to facilitate object localization and object detection. This can happen, for example, before or during the unlocking of the vehicle and when a passenger enters the vehicle, especially when he or she gives an unlock command to the vehicle, for example via an external control such as a remote control, smartphone and/or other device. By comparing the previous state with the current state, object detection can better detect the differences that are subsequently caused by the vehicle occupant.

Alternatively or additionally, the object detection device can search for other devices, preferably active devices, vehicle device and sensors that can perform and/or support object detection. For this purpose, a control signal can be sent regularly, but at least during and after activation of the vehicle, which searches for modified sensor data, vehicle device and/or additional devices. This control signal can be sent either wired or wireless. The devices, vehicle device and/or sensors found are then included in the object detection procedure by the control or regulating device of the object detection device in order to obtain data and/or send data. These steps can also be carried out before the recording of background data is executed or completed. In this way, as many devices, vehicle device and/or sensors as possible can provide background data that lead to an improvement in object detection.

The features of the invention disclosed in the foregoing description, drawings and claims may be essential for the realization of the invention in its various embodiments, either individually or in any combination.

REFERENCE CHARACTER LIST

A, A', B, C, C', D, D' Illumination limits
N Near field
F far field
2 Lighting device
3, 3', 3", 3'", 3"" Light source
4 Optic system
5, 5', 5", 5'", 5"" Optical element
10 Motor vehicle
12 Camera system
14 Dashboard
16 Lighting device
17 Windshield
18 Vehicle occupant seat
20 Roof
22 Headliner
24 Head
26 Vehicle occupant
28 Eye
30 Nose
32 Hand
34, 34', 34" Handle
36 A-pillar
38 B-pillar
40 C-pillar
42 Door components
44 Housing
46 Display device
48 Header
50 Armrest
52 Positioning mechanism

What is claimed is:

1. An object detection device for detecting at least one moving object in the interior of a motor vehicle, comprising:
a camera system comprising at least one sensor for converting electromagnetic radiation into electrical signals and a lighting device with at least one light source and an optic system; and
a control or regulating device which is designed to receive the electrical signals from the camera system to generate control commands and to transmit them to the camera system or a further device,
wherein the lighting device is configured to illuminate specific areas, including a near field (N) and a far field (F), in the motor vehicle using multiple optical elements of the optic system, the lighting device comprising multiple light sources as a matrix of light-emitting diodes (LEDs), wherein the multiple optical elements are assigned to the LEDs as a matrix optics, wherein the optic system is connected downstream of the light sources, wherein the near field is illuminated with a first light source of the matrix of LEDs, the assigned optical element of the first light source providing light intensity distributed over a first spatial field and wherein the far field is illuminated by a second light source of the matrix of LEDs, the assigned optical element of the second light source providing light intensity distributed over a second spatial field, the first spatial field larger than the second spatial field,
at least one additional lighting device and an additional camera system, wherein at least one of the optical element of the optic system, the at least one additional lighting device, or the additional camera system is positioned in the vicinity of the object, wherein the electrical signals contain at least one distance information for a plurality of object points detected by the camera system,
wherein the illumination, a detection of a localization of the object or of the object points or the activation of at least one of the lighting devices or camera systems is determined by a state of the motor vehicle, the state of the motor vehicle being determined by at least one of a speed, an acceleration, a vehicle seat occupancy, a vehicle seat position, a vehicle seat orientation, a lighting, or a lighting of the vehicle interior, or by at least one of a state of the environment of the motor vehicle, the state of the environment of the motor vehicle being determined by at least one of weather, day, night, roadway, traffic sign or a traffic situation.

2. The object detection device according to claim 1, wherein the lighting device of the camera system, the additional lighting device or the lighting device of the additional camera system comprises more than one light source, wherein each light source can be activated independently from each another depending on the state of the object, the state of the motor vehicle or the state of the environment of the motor vehicle or a distance of the object to the camera system including the sensor of the camera system, or to the additional camera system including a sensor of the additional camera system.

3. The object detection device according to claim 1, wherein the control or regulating device changes the illumination of different areas in the interior of the motor vehicle based on the state of the object, the state of the motor vehicle or the state of the environment of the motor vehicle or a distance of the object to the camera system including the sensor of the camera system, or to the additional camera system including a sensor of the additional camera system.

4. The object detection device according to claim 1, wherein the illumination, the detection of a localization of the object or of the object points or the activation of at least one of the lighting devices or camera systems is determined by the state of the object, wherein the state of the object is determined by at least one of a size, weight, breathing, heartbeat, temperature, acceleration, movement, or physical fitness of a vehicle occupant.

5. The object detection device according to claim 1, wherein the lighting device of the camera system, a lighting device of the additional camera system, the additional lighting device, the camera system or the additional camera system is at least partially attached to or integrated in a dashboard, a center console including a retractable or movable center console, a windshield, a roof, a headliner, a handle, an A-pillar, a B-pillar, a C-pillar, a door component, above a door, a housing including a dome-shaped housing in the region of the vehicle center on the roof or headliner, a display device, a vehicle occupant seat including a head part, a foot compartment or an armrest of the vehicle occupant seat, a restraint system for the vehicle occupant, a positioning mechanism including a motor-driven positioning mechanism, a trim and/or the further device.

6. The object detection device according to claim 5, wherein the lighting device is integrated in the display device and comprises light sources distributed over a display area of the display device, wherein the light sources of the display device comprise groups of emitters or regions with different spectral emission areas, which are designed to be able to provide light in at least part of a spectral range used for object detection, or additionally comprise spectral emitters for the spectral range of object detection.

7. The object detection device according to claim 5, wherein the further device is in form of a mobile device of the object.

8. The object detection device according to claim 1, wherein the optic system comprises guides or rotating wheels for exchanging or displacing the optical element or actuator means for inducing movements, or the optical element of the optic system comprises lenses, filters, adaptive optics, active optical elements or mirrors.

9. The object detection device according to claim 1, further comprising a computer or control unit designed to evaluate by an object localization algorithm or an object detection algorithm the electrical signals or the included data of the electrical signals.

10. The object detection device according to claim 1, wherein the control or regulating device is designed to control or coordinate the camera system, the additional camera system, the lighting device of the camera system, the additional lighting device, the lighting device of the additional camera system, the at least one additional sensor, the further device or a mobile device.

11. The object detection device according to claim 1, wherein the illumination can be determined via at least one of a spectral frequency, an amplitude, a duration, a polarization, or an intensity of the illumination.

12. The object detection device according to claim 11, wherein a duration is determined by a pulse length or wherein the spectral frequency lies above or below the frequency of visible light.

13. A method for operating the object detection device according to claim 1, the method comprising:
acquiring a signal or data;
localizing the object;
adapting the illumination of the object; and
detecting the object or generating a control command.

14. The method according to claim 13, wherein prior to signal or data acquisition, a background data acquisition or a connection to the device, sensor or further device is performed.

15. A motor vehicle, including an autonomous driving motor vehicle, comprising:
an object detection device according to claim 1 which is configured to perform a method comprising:
acquiring a signal or data;
localizing the object;
adapting the illumination of the object; and
detecting the object or generating a control command.

16. The motor vehicle according to claim 15, wherein the object detection device is designed for autonomous driving, or the control or regulating device is designed for adjusting the position of the vehicle occupant in the vehicle interior, including adjusting the position via a vehicle occupant seat, of a display device, of a dashboard, of a center console, of a vehicle opening, of a warning device, of a heating device, of an air conditioning device, of a navigation system, of an audio system, of a telephone system, of a video system, of a hologram system or of a positioning mechanism.

17. The motor vehicle according to claim 16, wherein the positioning mechanism is in operative connection with or is configured to be brought into operative connection with the vehicle occupant seat, the display device, the dashboard, the center console, the vehicle opening, the warning device, the heating device, the air conditioning device, the navigation system, the audio system, the telephone system, the video system or the hologram system.

18. The motor vehicle according to claim 16, wherein the center console includes a retractable or movable center console.

19. The object detection device of claim 1, wherein the object is in form of at least a part of a vehicle occupant.

20. The object detection device of claim 1, wherein the control and regulation device is designed to further receive data from at least one of the additional sensor or the further device.

21. An object detection device for detecting at least one moving object in the interior of a motor vehicle, comprising:
a camera system comprising at least one sensor for converting electromagnetic radiation into electrical signals and a lighting device with at least one light source and an optic system;
a control or regulating device which is designed to receive the electrical signals from the camera system to generate control commands and to transmit them to the camera system, a further device or a device of the motor vehicle; and
a computer or control unit designed to evaluate the electrical signals and/or the data,
wherein the lighting device is configured to illuminate specific areas, including a near field (N) and a far field (F), in the motor vehicle using multiple optical elements of the optic system, the lighting device comprising multiple light sources as a matrix of light-emitting diodes (LEDs), wherein the multiple optical elements are assigned to the LEDs as a matrix optics, wherein the optic system is connected downstream of the light sources, wherein the near field is illuminated with a first light source of the matrix of LEDs, the assigned optical element of the first light source providing light intensity distributed over a first spatial field and wherein the far field is illuminated by a second light source of the matrix of LEDs, the assigned optical element of the second light source providing light intensity distributed over a second spatial field, the first spatial field larger than the second spatial field, at least one additional lighting device and an additional camera system, wherein at least one of the optical element of the optic system, the at least one additional lighting device, or the additional camera system is positioned in the vicinity of the object, wherein the electrical signals contain at least one distance information before a plurality of object points detected by the camera system, wherein the illumination, a detection of a localization of the object or of the object points or the activation of at least one of the lighting devices or camera systems is determined by a state of the motor vehicle, the state of the motor vehicle being determined by at least one of a speed, an acceleration, a vehicle seat occupancy, a vehicle seat position, a vehicle seat orientation, a lighting, or a lighting of the vehicle interior, or by a state of the environment of the motor vehicle, the state of the environment of the motor vehicle being determined by at least one of weather, day, night, roadway, traffic sign, or a traffic situation.

* * * * *